A. J. WESTMAN.
NUT LOCK.
APPLICATION FILED APR. 24, 1916.

1,226,834.

Patented May 22, 1917.

WITNESSES
R. D. Spaulding,
Carroll Bailey

INVENTOR
August J. Westman,
BY Richard Bowen,
ATTORNEY

UNITED STATES PATENT OFFICE.

AUGUST J. WESTMAN, OF MONROE, WASHINGTON.

NUT-LOCK.

1,226,834. Specification of Letters Patent. Patented May 22, 1917.

Application filed April 24, 1916. Serial No. 93,210.

*To all whom it may concern:*

Be it known that I, AUGUST J. WESTMAN, a citizen of the United States, residing at Monroe, in the county of Snohomish and State of Washington, have invented certain new and useful Improvements in Nut-Locks, of which the following is a specification.

This invention relates to nut locks, and has particular reference to that class of nut locks wherein superposed nuts are utilized to obtain a locking action, means being arranged between the nuts, to prevent a relative turning movement, and to prevent unitary turning movement of both upon the bolt.

The nature, as well as the objects and advantages of the invention will appear from the perusal of the annexed description taken in connection with the accompanying drawings, while the novel features of construction, combination and arrangement of parts will be obvious from the reading of the appended claims.

Figure 1:
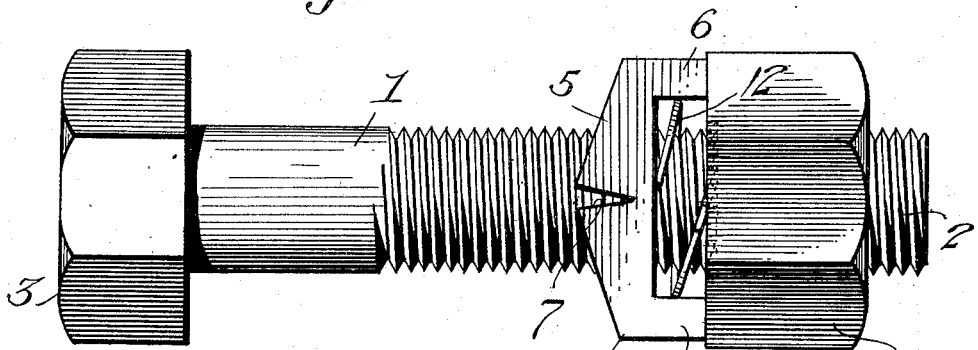
Figure 2:
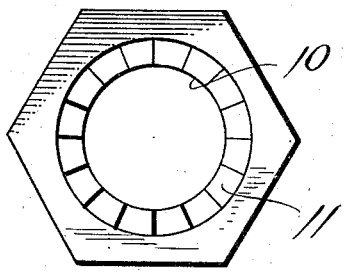
Figure 3:
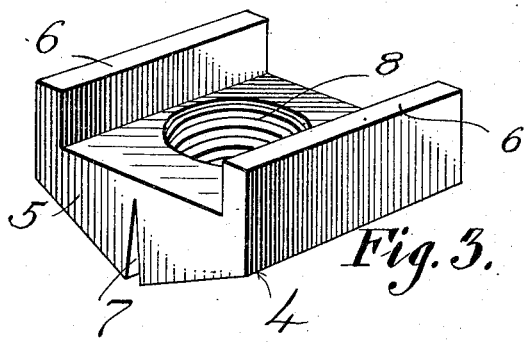
Figure 4:
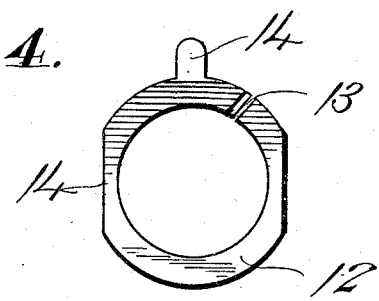

In the drawings wherein is illustrated the preferred embodiment of my invention, Figure 1 is a side elevation of a bolt equipped with the improved nut lock, Fig. 2 is an inner face view of one of the nuts, Fig. 3 is a perspective of the other nut, and, Fig. 4 is a plan view of the locking member.

Referring to the drawings by numerals, 1 designates a bolt of any usual construction which includes a threaded shank 2 and a head 3. The improved nut lock consists of a nut 4 which includes a body portion 5 of substantially rectangular shape having extending from one face thereof a pair of parallel spaced arms 6. The arms 6 extend from two edges of the body portion 5 and the space therebetween is slightly greater than the diameter of the bolt. The face of the body portion 5 opposite to that carrying the arms 6 is tapered or beveled from a point intermediate its ends outwardly toward the arms 6, so that the same is enlarged centrally and is relatively reduced adjacent its outer edges, that is, the edges underlying the arms 6. The body portion is provided with a slot 7 which extends in the direction of the arms 6 and is arranged at the apex of the beveled faces of the nut, being extended thereinto, any desired distance, and being preferably of substantially V-shape.

The nut 4 is adapted to be threaded upon the shank 2 with the beveled faces thereof facing the head 3 of the bolt, the said nut being provided with a central threaded bore 8 for threaded engagement with the bolt, while the beveled faces thereof are adapted for engagement with the article or object to be clamped.

The second nut 9 is adapted to be threaded upon the shank 2 after the nut 4 has been drawn into clamping engagement with the object. This nut 9 is of usual construction except that upon its inner face adjacent the threaded bore 10 therein it has ratchet teeth 11 formed thereon, the teeth preferably lying within the plane of the inner face of the nut.

Before the nut 9 is threaded upon the shank 2, however, a locking member 12 is adapted to be placed thereon. This locking member consists of a ring of inherently resilient material which has an opening to permit of the same being passed over the shank of the bolt and is of a width so as to lie between the outer face of the shank and the adjacent faces of the arms 6. This ring is split, as at 13 and the ends thereof extended in opposite directions, as is illustrated to advantage in Fig. 1 of the drawings, while at diametrically opposite points thereon the outer edges thereof are cut away to provide straight walls 14. These straight walls are adapted for engagement with the inner straight edges of the arms 6, so that when the member is arranged upon the shank and between the arms 6 turning movement relative to the nut 4 will be prevented. By extending the ends of this member in opposite directions one of the same will engage with the outer face of the nut 4 while the other will extend slightly beyond the plane of the outer faces of the arms 6. Thus, when the nut 9 is threaded upon the shank the outwardly extending end of the locking member will engage with the ratchet teeth 11. The teeth 11 are arranged in a direction so that turning movement of the nut 9 in a direction to bind against the arms 6 is permitted, the end of the member 13 engaging therewith to prevent movement of the nut 9 in an opposite direction upon the bolt. If desired, the locking member 13 may be provided with a tongue 14 upon its outer edge adjacent the outwardly extending end thereof so that the same may be conveniently gripped by the fingers of a person to move the outer end of the locking member upon engagement of the teeth 11 to permit of removal of the nut 9.

By the provision of the slot 7 it will be noted that as the nut 9 is drawn into engagement with the arms of the nut 4 the thickened portion of the body of the nut 4 will be forced into clamping engagement with the shank, thereby serving as a further locking means for the nut.

From the foregoing description taken in connection with the accompanying drawings, it is thought that the construction and operation of the improved nut lock may be clearly understood, and while I have herein shown and described one specific embodiment of my invention, I do not wish to be limited thereto, except for such limitations as the claims may import.

I claim:

1. The combination with a bolt, of a nut for threaded engagement therewith, said nut including a body portion having arms extending therefrom, an inherently resilient locking member arranged between said arms, and a second nut for engagement with said arms, said nut having means to be engaged by the locking member to prevent turning movement of the second nut.

2. The combination with a bolt, of a nut for threaded engagement therewith, said nut having a slot formed therein, arms extending from the nut, a locking member interposed between the arms, means to prevent turning movement of the locking member relatively to the nut, a second nut for engagement with the first nut, means on said second nut to be engaged by the locking member.

3. The combination with a bolt, of a nut threaded thereon, said nut having a slot formed therein, spaced arms formed on said nut, a locking member arranged between said arms, said locking member being split and provided with straight edges for engagement with the arms, a second nut for engagement with the first nut, ratchet teeth formed on said second nut to be engaged by the locking member, and a tongue on said locking member.

In testimony whereof I affix my signature in presence of two witnesses.

AUGUST J. WESTMAN.

Witnesses:
C. BEADON HALL,
GORDON V. HALL.

Copies of this patent may be obtained for five cents each, by addressing the "Commissioner of Patents, Washington, D. C."